United States Patent Office 2,715,611
Patented Aug. 16, 1955

2,715,611

AIR DEODORANT

Lloyd E. Weeks, Union, Ohio, assignor to Monsanto Chemical Company, St. Louis, Mo., a corporation of Delaware No Drawing. Application June 23, 1950,
Serial No. 170,061

3 Claims. (Cl. 252—1)

The present invention relates to deodorizing air and deals more particularly with air deodorizing compositions comprising certain organic peroxidic compounds.

An object of the invention is to provide efficient, easily applied and readily available air deodorants. Another object of the invention is to provide a highly effective means of deodorizing foul air in confined spaces. Still another object of the invention is to provide a means of freshening air in closed spaces.

These and other objects which will be hereinafter disclosed are provided in the following invention wherein air is deodorized by diffusing therein an organic peroxidic compound having the general formula

R—O—O—X in which R is a hydrocarbon residue of from 4 to 18 carbon atoms and X is a member of the group consisting of hydrogen, alkali metal and alkaline earth metal. As illustrative of compounds having the above formula may be mentioned tert.-butyl hydroperoxide, tert.-dodecyl hydroperoxide, iso-octenyl hydroperoxide, cyclopentyl hydroperoxide, tetralin hydroperoxide, cyclohexene hydroperoxide, naphthalene hydroperoxide, cumene hydroperoxide, sec.-butylbenzene hydroperoxide, isopropenylbenzene hydroperoxide, etc., and potassium, lithium, calcium, barium, strontium, and magnesium salts of such hydroperoxides.

It has been known for some time that air can be regenerated and that odors present in offensive air may be minimized or completely obliterated by treatment of the air with ozone, hydrogen peroxide or other inorganic peroxygen compounds. However, the use of ozone or the inorganic peroxides has been of comparatively little importance in that steady diffusion of these materials into the air offered practical difficulties, and the use of the inorganic per compounds has been complicated by the fact that in order that active oxygen be liberated therefrom it was necessary to provide a means for decomposing the per compounds previous to the air treatment.

Now I have found that very offensive air may be efficiently deodorized by diffusing into the air solutions or suspensions of the organic hydroperoxides described above, that the preparation and diffusion of such solutions or suspensions present no practical difficulties and that the deodorizing efficiency of the diffused organic peroxidic compounds is not dependent, as in the case of the inorganic peroxides, on the presence of an extraneous, decomposing or oxygen-liberating agent other than the odorifierous material to be destroyed.

I may apply the present hydroperoxides in various ways. Preferably, diffusion of the compound into the air is effected in aerosol form. An aerosol bomb comprising the hydroperoxide may be prepared by dissolving the hydroperoxide in a liquefied gas, e. g., dichlorodifluoromethane, or methyl chloride and releasing the resulting solution under the vapor pressure of the solvent through an orifice or nozzle. Evaporation of the solvent causes the hydroperoxide to be suspended in the form of an aerosol. The solvent employed in the aerosol bomb should, of course, be one having a high vapor pressure, preferably a vapor pressure of from, say, 2 atmospheres to 100 atmospheres of pressure. Accordingly, liquefied gases which are free of objectionable odors are most suitably employed in the preparation of the aerosol bombs.

Aerosols of the more stable of the present hydroperoxides may also be prepared by impinging solutions of the hydroperoxides upon hot metal surfaces or plates. Among the compounds which may be diffused in this manner are the aralkyl hydrocarbon hydroperoxides having a tert.-carbon atom such as cumene hydroperoxide.

The present hydroperoxides may also be dissolved in the usual organic solvents such as ethanol, carbon tetrachloride, ethylene glycol, monobutyl ether, etc. and sprayed or atomized into the enclosed space which is to be treated. Water suspensions of the hydroperoxides may also be used as sprays, or the hydroperoxides may be incorporated into the water of air-conditioning systems and introduced into the air through such systems.

I have found, however, that the more intimate dispersion or diffusion which is attained by applying the hydroperoxides as aerosols contributes essentially to the deodorizing efficiency of the present compounds. When the hydroperoxides are to be employed as aerosols, only very small concentrations of the same need be used. The peroxide or hydroperoxide may be dissolved in an aerosol type propellant solvent, employing a volume ratio of say, from 3 parts to 100 parts of hydroperoxide to 10,000 parts of solvents, depending upon the effectiveness of the deodorizing principle, i. e., the particular hydroperoxide employed, and the resulting solution may be packaged into an aerosol bomb for convenient treatment of air in confined spaces. Aerosols thus produced free the air of odors produced in living quarters, such as the acrolein, mercaptan, sulfide, and amine odors of cooking, the pyridine odors associated with smoking, the butyric and valeric acids of perspiration, etc. The packaged product may be conveniently employed for diffusing the peroxidic compound into such enclosed spaces as dwelling quarters, barns and stables, trains, airplanes, theaters, shops, etc.

The invention is further illustrated, but not limited, by the following examples:

Example 1

5.7 g. of cumene hydroperoxide (69 per cent strength) was dissolved in a mixture consisting of 2000 ml. of trichlorofluoromethane and 2000 ml. of dichlorofluoromethane at a temperature below the boiling point of the solvents. The resulting solution was packaged by adding 250 ml. portions of the solution to 16-ounce, low pressure aerosol bomb containers and the filled containers were rapidly machine sealed. Evaluation of the packaged product was made by spraying the material into a test chamber having dimensions of 12 feet x 11 feet x 11 feet and contaminated with various odors as follows:

In separate vessels within the test chamber 100 g. of cabbage, 80 g. of fish and 100 g. of onions were boiled in 200 ml. of water, each for 30 minutes. The cooking vessels with their contents were then removed from the test chamber and the fluid from the aerosol bomb, prepared as described above, was sprayed for 20 seconds into the contaminated test chamber. At the end of that time there was substantially no odor of cabbage and fish and only a very slight odor of onions.

When repeating the test described above with 3 commercially available air deodorizing compositions instead of the present hydroperoxide aerosol bomb, only very little moderation of the odors was perceived and in most instances such moderation was accompanied by newly introduced odors which were peculiar to the individual deodorozing composition applied.

Example 2

Pieces of onion about 1 cm. x 0.5 cm. x 0.5 cm. in size were placed in 5.0 cm. Petri dishes. The dishes were then sprayed with one of the following deodorant solutions and then immediately covered. After a time of 5 minutes the odor in each of the sprayed and covered dishes was observed to be as follows:

| Deodorant Solution Employed | Odor After Spraying |
|---|---|
| 0.10% by vol. of 69% cumene hydroperoxide in CCl₄. | sweet, very slight onion odor. |
| 0.10% by vol. of 25% p-cymene hydroperoxide in CCl₄. | slight onion. |
| 0.10% by vol. of 40% aqueous Hyamine 2389* in water. | strong onion. |
| 0.10% by vol. of Hyamine 1622* in water. | Do. |
| 0.10% by vol. of Hyamine 10-X* in water. | Do. |

*Commercially available synthetic organic bactericides, deodorants and disinfectants.

Instead of using cumene hydroperoxide or cymene hydroperoxide as in the above examples, other hydrocarbon hydroperoxides of from 4 to 18 carbon atoms may be similarly used, e. g., secondary-butylbenzene hydroperoxide, the sodium or potassium salt of tertiary-butyl hydroperoxide, cyclohexene hydroperoxide, tetralin hydroperoxide, etc. Also instead of using a mixture of trichlorofluoromethane and dichlorofluoromethane either of these solvents may be used alone or may be used as solvents with other low-boiling materials such as methyl chloride, butane, propane, carbon tetrachloride, etc. Instead of employing aerosol bombs as a means of introducing the present hydroperoxides into the obnoxious air the hydroperoxides may be dissolved in high-boiling liquid solvents such as benzene, toluene, etc. and atomized or sprayed into the chamber or they may be suspended in water and introduced into the enclosed spaces by incorporating the water suspension into a water air-conditioning system. The hydroperoxides per se have a rather fragrant odor; however, if desired, the aerosol bombs or sprays comprising the hydroperoxides may contain also additional fragrant-imparting materials.

What I claim is:

1. An air-deodorizing composition consisting of a solution, in a low-boiling chlorofluoromethane, of a hydroperoxide having the general formula

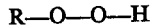

in which R is selected from the class consisting of alkyl and aralkyl radicals of from 4 to 18 carbon atoms, said composition containing from 0.03 per cent to 1% of said hydroperoxide, and being maintained in the liquid state by super-atmospheric pressure.

2. An air deodorizing composition consisting of a solution, in a mixture of trichlorofluoromethane and dichlorofluoromethane, of a hydroperoxide having the general formula

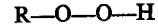

in which R is selected from the class consisting of alkyl and aralkyl radicals of from 4 to 18 carbon atoms, said composition containing from 0.03 percent to 1% of said hydroperoxide, and being maintained in the liquid state by super-atmospheric pressure.

3. An air deodorizing composition consisting of a solution of cumene hydroperoxide in a mixture of trichlorofluoromethane and dichlorofluoromethane, said composition containing from 0.03 per cent to 1.0 per cent of said hydroperoxide and being maintained in the liquid state by superatmospheric pressure.

References Cited in the file of this patent

UNITED STATES PATENTS

| 1,648,259 | Cadwell | Nov. 8, 1927 |
| 1,840,269 | Borgstrom | Jan. 5, 1932 |
| 2,394,887 | Berl | Feb. 12, 1946 |
| 2,491,926 | Lorand et al. | Dec. 20, 1949 |
| 2,534,309 | Sheffield | Dec. 19, 1950 |
| 2,544,093 | Kilgore | Mar. 6, 1951 |
| 2,593,761 | Johnstone | Apr. 22, 1952 |

OTHER REFERENCES

Industrial and Engineering Chemistry, vol. 40, No. 4, page 700, "Propellants for Low Pressure Liquefied Gas Aerosols" by R. A. Fulton.

Modern Plastics, vol. 25, November 1947, pages 134–135, "Organic Peroxides—Properties and Uses" by Perry and Seltzer.